(12) United States Patent
Kwon et al.

(10) Patent No.: US 12,572,162 B2
(45) Date of Patent: Mar. 10, 2026

(54) SYSTEM AND METHOD FOR PRECISE FORCE CONTROL OF ROBOT

(71) Applicant: Electronics and Telecommunications Research Institute, Daejeon (KR)

(72) Inventors: Wookyong Kwon, Daejeon (KR); Dongyeop Kang, Daejeon (KR); Chan Eun Park, Daejeon (KR); Jaemin Baek, Daejeon (KR); Seungcheon Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 18/122,514

(22) Filed: Mar. 16, 2023

(65) Prior Publication Data

US 2024/0077892 A1      Mar. 7, 2024

(30) Foreign Application Priority Data

Jun. 16, 2022     (KR) ........................ 10-2022-0073411

(51) Int. Cl.
*G05D 15/01*                    (2006.01)

(52) U.S. Cl.
CPC .................................... *G05D 15/01* (2013.01)

(58) Field of Classification Search
CPC ....... G05D 15/01; B25J 9/1633; B25J 9/1653; G05B 2219/39339
See application file for complete search history.

(56) References Cited

U.S. PATENT DOCUMENTS

| | | | | |
|---|---|---|---|---|
| 2005/0113971 A1* | 5/2005 | Zhang | .................... | B25J 9/1687 |
| | | | | 700/245 |
| 2014/0297034 A1 | 10/2014 | Lee | | |
| 2014/0379131 A1* | 12/2014 | Ryu | ........................ | B25J 9/1633 |
| | | | | 901/9 |

(Continued)

FOREIGN PATENT DOCUMENTS

| | | |
|---|---|---|
| JP | 2010-142909 | 7/2010 |
| JP | 2016-120561 | 7/2016 |

(Continued)

*Primary Examiner* — Jason Holloway
*Assistant Examiner* — Madison B Emmett
(74) *Attorney, Agent, or Firm* — KILE PARK REED & HOUTTEMAN PLLC

(57)                    ABSTRACT

Provided is an invention capable of securing versatility and precision in admittance control and enabling target force control on a surface of an object having a different property, in which a mutual contact force-based compensation method is used in the existing admittance control method to output a target force. To this end, the present disclosure provides a compensation algorithm that changes according to a mutual contact force with an object having a different physical property and mass-spring-damper parameters using data acquired while controlling a force input from a robot is provided. In addition, the present disclosure automatically performs tuning on coefficients related to a factor of a robot force control based on data obtained by executing a mutual contact force-based compensation in the conventional admittance control.

15 Claims, 6 Drawing Sheets

(56) References Cited

U.S. PATENT DOCUMENTS

| | | | |
|---|---|---|---|
| 2015/0174760 A1* | 6/2015 | Fukuda | B25J 9/1687 |
| | | | 700/260 |
| 2015/0217445 A1 | 8/2015 | Hietmann et al. | |
| 2016/0288332 A1* | 10/2016 | Motoyoshi | B25J 13/085 |
| 2017/0028552 A1 | 2/2017 | Lee | |
| 2018/0029228 A1* | 2/2018 | Haddadin | B25J 9/1633 |
| 2018/0111270 A1* | 4/2018 | Hasegawa | B25J 9/1682 |
| 2020/0180150 A1* | 6/2020 | Kikuuwe | G05B 13/041 |
| 2020/0298403 A1* | 9/2020 | Nilsson | B23Q 3/15713 |
| 2020/0306865 A1* | 10/2020 | Motohashi | B25J 11/005 |
| 2021/0107142 A1* | 4/2021 | Solowjow | B25J 9/1633 |
| 2021/0138639 A1* | 5/2021 | de Lange | B25J 9/1633 |
| 2021/0138641 A1* | 5/2021 | Kogan | B25J 13/085 |
| 2021/0138642 A1* | 5/2021 | Verdi | B25J 9/1641 |
| 2021/0370507 A1* | 12/2021 | Corcodel | B25J 9/1633 |
| 2021/0394360 A1* | 12/2021 | Hwang | B25J 9/1612 |
| 2022/0009095 A1* | 1/2022 | Huang | B25J 9/1607 |
| 2022/0305645 A1* | 9/2022 | Nikovski | B25J 9/1648 |
| 2022/0371186 A1* | 11/2022 | Zhang | B25J 9/0084 |
| 2024/0077892 A1* | 3/2024 | Kwon | G05D 15/01 |
| 2024/0091934 A1* | 3/2024 | Ju | B25J 9/1633 |

FOREIGN PATENT DOCUMENTS

| | | |
|---|---|---|
| JP | 2019-20826 | 2/2019 |
| KR | 10-2020-0004862 | 1/2020 |

* cited by examiner

110 — SET UP TARGET FORCE

120 — SET UP TRAJECTORY OR MOVEMENT OF ROBOT

130 — ACQUIRE DATA

FILTER DATA — 140

STORE DATA (FACTOR, FORCE, TIME) — 150

FIG. 5B

Steel(Ref.)
Melamine foam
High density Polyethylene foam
Low density Polyethylene foam

SYSTEM AND METHOD FOR PRECISE FORCE CONTROL OF ROBOT

CROSS-REFERENCE TO RELATED APPLICATION

This application claims priority to and the benefit of Korean Patent Application No. 10-2022-0073411 filed on Jun. 16, 2022, the disclosure of which is incorporated herein by reference in its entirety.

BACKGROUND

1. Field of the Invention

The present disclosure relates to force control for a robot, and more specifically, to robot force control based on admittance control.

2. Discussion of Related Art

As the use of robots is expanding from the industry field to the service field, there is a growing demand for collaborative work through the interaction between a robot and a human. In the robot and human collaboration, the machine-human contact is inevitable, and a force control method of adjusting the contact force is required. In addition, in order to flexibly and successfully perform various robot tasks (welding, deburring, polishing, and the like) through reciprocal adaptive responses, there is a need for a precise force control.

Admittance control used in the conventional technology indirectly controls the force of a robot by generating a virtual dynamic model on a contact surface of an object interacting with a robot. According to the approach, a virtual mass-spring-damper system in the form of a second-order differential equation is set on a contact surface and a target motion and a target force are applied to realize an interactive force. Such an admittance control approach is achieved by calculating a target position based on a force signal obtained from an interactive contact part by a six-axis force sensor or torque sensor mounted on a force acting part, such as an end-effector of a robot, and transmitting the target position to a control unit.

However, since the admittance control is a method of indirect force control, the relationship between the mass, spring, and damper parameters and the target force is not linear, and thus it is difficult to determine the respective parameters for precisely operating a desired force. In addition, due to the influence of a stiffness of an end effector, properties of a contact surface, a frictional force, a robot modeling error, and the like, the conventional admittance control approach has a difficulty in immediately responding to an atypical work environment without a professional engineer. In other words, with only the conventional admittance control method, compensation for disturbances is not sufficiently applied during force control through the indirect mass-spring-damper system, so there is a limitation in precisely operating a target force. In addition, the mass-spring-damper parameters need to be adjusted in response to a change of the contact surface model between a robot and an object with a different physical property, which causes a difficulty in constantly deriving a target result value.

SUMMARY OF THE INVENTION

Therefore, the present disclosure proposes a technology of securing versatility and precision in admittance control and facilitating target force control on a surface of an object having a different property.

In order to address the above limitation, the present disclosure additionally applies a compensation based on mutual contact force to the existing admittance control when controlling the force of a robot. To this end, the present disclosure provides a compensation algorithm that changes according to a mutual contact force with an object having a different physical property and mass-spring-damper parameters, by using data acquired while controlling a force which is input from a robot.

In addition, the present disclosure is implemented to automatically perform tuning on coefficients related to a control factor of a robot force based on data obtained by adding the compensation based on mutual contact force to the conventional admittance control.

The concept of the present disclosure introduced above will become more apparent based on specific embodiments described with reference to the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 5A and 5B are graphs for verifying the effect of the present disclosure, in which FIG. 5A shows a case in which a mutual contact force-based compensator is not used, and FIG. 5B shows a case in which a mutual contact force-based compensator is used.

DETAILED DESCRIPTION OF EXEMPLARY EMBODIMENTS

Hereinafter, exemplary embodiments of the present disclosure will be described in detail with reference to the accompanying drawings. Terms used herein are used for describing the embodiments and are not intended to limit the scope and spirit of the present disclosure. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
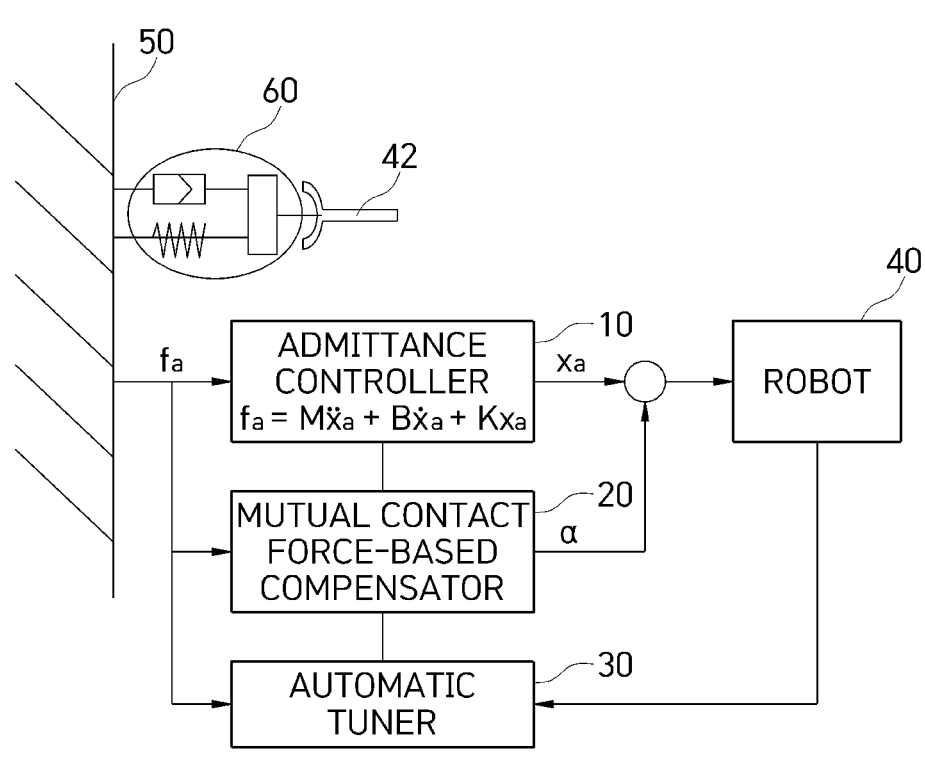
FIG. 1 is a block diagram illustrating a robot precision force control system according to the present disclosure.

FIG. 1 is a block diagram illustrating a robot precision force control system according to a preferred embodiment of the present disclosure.

A compensator 20 based on mutual contact force and an automatic tuner 30 are added to the existing admittance controller 10.

The admittance controller 10 sets up a virtual mass-spring-damper system 60 on a contact surface 50 of a contact object (or environment) having a different physical property from and interacting with a force acting part 42 (e.g., a distal end part, an end-effector, etc.) of a robot 40 to actuate a target motion and a target force, thereby deriving an interactive force. The admittance controller 10 generally detects a contact force $f_a$ applied to the contact surface 50 by the force acting part 42 of the robot 40 to obtain a displacement $x_a$. In this process, in the virtual mass-spring-damper system 60 in the form of a second-order differential equation ($f_a = M\ddot{x}_a + B\dot{x}_a + Kx_a$ in the example of FIG. 1) including parameters M, B, and K, the displacement $x_a$ may have a result that varies with the parameters M, B, and K.

The compensator based on mutual contact force 20 uses a mutual contact force-based compensation algorithm to estimate a mutual contact stiffness $K_{env}$ for the contact object having a different physical property, derives a compensation value $\alpha$ from the estimated mutual contact stiffness $K_{env}$, and uses the compensation value $\alpha$ to compensate for the displacement $x_a$ derived from the admittance controller 10. Here, the mutual contact stiffness $K_{env}$ refers to a stiffness felt by a robot, not a stiffness of the actual contact object. That is, $K_{env}$ means the mutual contact stiffness or mutual contact elastic modulus that occurs between a contact object and a robot. This definition may be described as a coefficient having interactive characteristics due to the contact target environment and the stiffness of the robot itself.

The magnitude of a target force is proportional to a difference in distance between the position of the force acting part 42 of the robot 40 and a target point, and therefore, in order to compensate the target force, the mutual contact force-based compensator 20 derives a compensation value $\alpha$ according to the difference in distance between the position of the force acting part 42 of the robot and the target point, and compensates for the displacement $x_a$. Therefore, the compensation value $\alpha$ may be considered a position difference (see FIG. 2B) suitable for compensating for a difference between a target force and a force generated from an actual object.

The mutual contact force-based compensator 20 uses a mutual contact force-based compensation algorithm according to the present disclosure for the existing admittance control algorithm to output a force targeted by the robot 40. The mutual contact force-based compensation algorithm derives a compensation value $\alpha$ according to a mutual contact force with an object having a different physical property and mass-spring-damper parameters, using data acquired while controlling a force input from the robot 40.

The value $\alpha$ is determined by Equation 1 as follows. In Equation 1 below, factor 1, factor 2, and factor 3 are factors that affect force control, and the number of them is not limited to three, and f(•) is a linear function according to each factor and is determined according to the relationship between the factors and the compensation value $\alpha$.

$$\alpha = f(\text{factor1}, \text{factor2}, \text{factor3}) \qquad \text{[Equation 1]}$$

More specifically, when considering the action of the mutual contact force-based compensator 20 according to the embodiment of the present disclosure, Equation 1 may become Equation 2 as follows. Equation 2 represents that the compensation value $\alpha$ is a function of an external force (a contact force) $f_a$ and a mutual contact stiffness $K_{env}$.

$$\alpha = f(f_a, K_{env}) \qquad \text{[Equation 2]}$$

The mutual contact force-based compensator 20 may, using a force sensor (not shown), initially detect a contact force with respect to a displacement deviation during a short period of time in which the force acting part 42 is in slight contact with an object, and estimate a mutual contact stiffness $K_{env}$ from the contact force.

As an example of a method of estimating a mutual contact stiffness $K_{env}$, a robot is allowed to move at a constant speed in one axis direction, in which case the position change with time is the same, so first a contact force. $\dot{F}_e$ that changes during a short period of time may be obtained as $$\dot{F}_e = \Delta F_e / \Delta t$$

from a value measured by a force sensor located at the distal end, and then the mutual contact stiffness $K_{env}$ may be estimated by differentiating the change of position and the change of the contact force through equation $$K_{env} = \Delta F_e / \Delta x$$

from the obtained force.

The material or texture of a surface of the object may be identified from the estimated value $K_{env}$. As an example of identifying the surface material, the range of a known mutual contact stiffness $K_{env}$ according to the material is obtained in advance from a pre-experimental data pair, and then a mutual contact stiffness $K_{env}$ is obtained through an actual experiment so that the material is estimated. For example, a mutual contact stiffness $K_{env}$ for a sponge is in a range of $100 < K_{env} < 320$, which is obtained in advance from pre-experimental data or accumulated data. Identified surface materials (e.g., sponge, steel, etc.) obtained as described above may constitute a table with known $K_{env}$ values obtained in advance according to the surface material as shown in Table 1 below.

The table below shows the materials of an object according to the mutual contact stiffness. Each value in the table is an exemplary numerical value.

| | $K_{env}$ (at M = 10, B = 20, K = 10) | $K_{env}$ (at M = 1, B = 2, K = 1) |
|---|---|---|
| Sponge | 200 | 300 |
| Tissue | 500 | 1000 |
| Styrofoam | 2000 | 3000 |
| Steel | 5000 | 10000 |

In the table, the stiffness may be changed when the parameters M, B, and K change, so the column of $K_{env}$ may be further extended according to the change in the parameters M, B, and K. Therefore, there is a need for automatically estimating the mutual contact stiffness $K_{env}$ according to the above described parameters M, B, and K for specific admittance control.

Figure 2A:
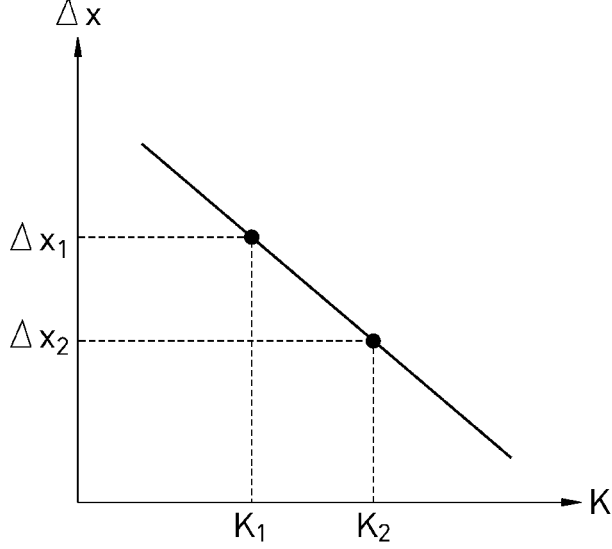
FIG. 2A is an exemplary graph illustrating a position change versus a change value of a mutual contact stiffness.

As described above, when mutual contact stiffnesses $K_{env}$ are obtained for several different materials, a graph of the position change $\Delta x_1 - \Delta x_2$ and the change value $K_1 - K_2$ of the mutual contact stiffness $K_{env}$ is drawn as in FIG. 2A, and the slope value $\alpha$ of the graph is easily obtained through optimization by reflecting data for several materials in a linear function.

Meanwhile, the automatic tuner 30 automatically tunes the value $\alpha$ of the mutual contact force-based compensator 20, and thus the force control method according to the present disclosure can be used universally. The operation of the automatic tuner 30 will be described.

The mutual contact stiffness $K_{env}$ and the compensation value $\alpha$ of the mutual contact force-based compensator 20 show a target variation data set ($K_{env}$, $\alpha$), and may be determined by a linear relationship as shown in Equation 3 below.

$$\alpha = p_1 \cdot K_{env} + p_2 \qquad \text{[Equation 3]}$$

In the linear relationship of Equation 3, coefficients $p_1$ and $p_2$ are values obtained according to the influence of factors, and may have values that are determined through the automatic tuner 30. Equation 1 or Equation 2 described above is expressed in the form of Ax=B as in Equation 3, and thus the linear relationship coefficients $p_1$ and $p_2$ may be estimated from the target variation data set ($K_{env}$, $\alpha$).

Figure 2B:
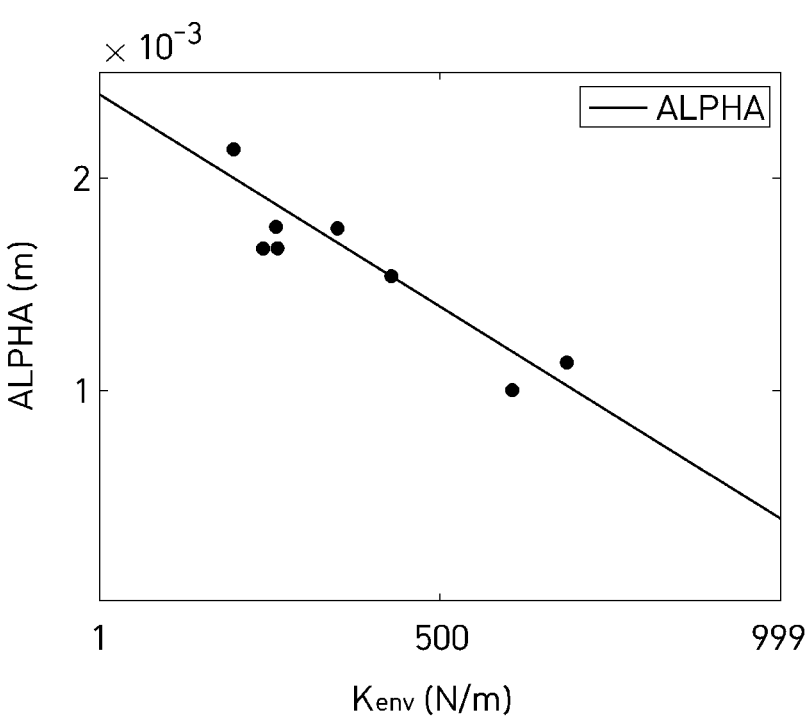
FIG. 2B is a diagram illustrating an example of a method of obtaining a factor-to-a relationship.

An example of obtaining the linear relationship between $K_{env}$ and a is shown in FIG. 2B. FIG. 2B shows a straight line obtained from a data distribution (indicated by dots) collected through repeated experiments to obtain factors, which is a straight line fitting the data obtained by linearizing the data distribution. In order to estimate the coefficients $p_1$ and $p_2$ that determine the form of the linear relationship of Equation 3 from the graph of FIG. 213, at least two pieces of information $K_{env}$ and at least two pieces of a are required. As described above, a corresponds to a position adjustment value for compensating for a difference between a force targeted for the conventional admittance control and a force generated in an object in practice.

Figure 3:
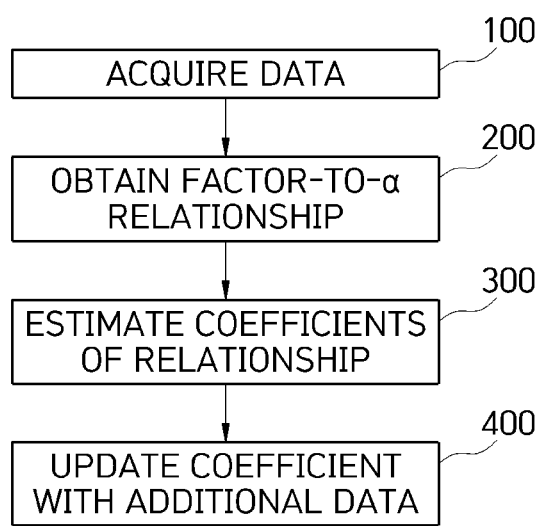
FIG. 3 is a flowchart showing a method of estimating coefficients of a factor-to-a relationship.

FIG. 3 is a flowchart showing a method of estimating coefficients $p_1$ and $p_2$ of Equation 3.

Figures 4A, 4B:
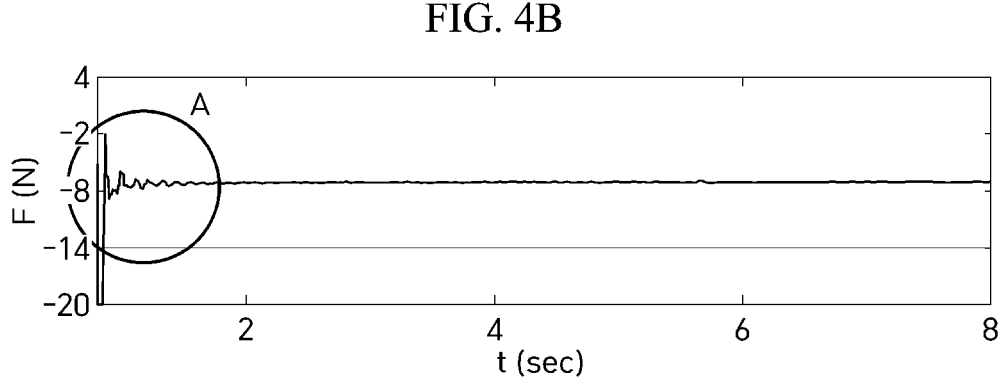
FIGS. 4A and 4B are views for describing a data acquisition process in FIG. 3.

First, force data obtained by adding the mutual contact force-based compensator 20 is acquired (100). Here, the data acquisition may be performed as shown in FIGS. 4A and 4B. That is, as shown in FIG. 4A, a target force of the operation of the robot 40 for the mutual contact force-based compensator 20 that influences an initial impact is set up (110), and a trajectory or movement of the robot 40 is set up (120), and then data is acquired while varying the values of various factors affecting the force control of the robot 40. As a method of data acquisition, a time-force (t-F) graph shown in FIG. 4B obtained for experimental control of the surface material may be used. Since an initial force contact section "A" is a transient section of the time taken until stabilization of control, when data is acquired from the graph, filtering is required to remove the data of section A and use the data of the subsequent stable section. As shown in FIG. 4A, after the data filtering (140) is performed, factors, force, and time data are finally stored (150).

Referring again to FIG. 3, the relationship between the factor $K_{env}$ and the compensation value $\alpha$ is found in the data acquired in the data acquisition process 100 (200), and the coefficients of the relationship (e.g., $p_1$ and $p_2$ in Equation 3) are estimated (300). In the previous example, the relationship between the mutual contact stiffness $K_{env}$ and the compensation value $\alpha$ may be expressed as an nth-order linear relationship as $\alpha = p_1 \cdot K_{env} + p_2$, and the coefficients of this linear relationship are found.

The coefficient value estimation may be performed through a data-based optimization process or a least square method. The relationship and coefficients determined thereby are applied to the actual robot 40 through the mutual contact force-based compensator 20.

When a certain amount of data is collected, a basic table is completed, and after that, the relationship is fixed, and the coefficients are continuously updated with additional data obtained in the task execution of the robot 40 (400).

As described above, the present disclosure uses the mutual contact force-based compensator 20 so that, even when the contact environment is changed, control for a target force may be easily performed. In addition, since the automatic tuner 30 estimates the coefficients $p_1$ and $p_2$, the compensation value $\alpha$ of the mutual contact force-based compensator 20 is automatically tuned, and thus the force control method according to the present disclosure can be used universally.

Figure 5A:
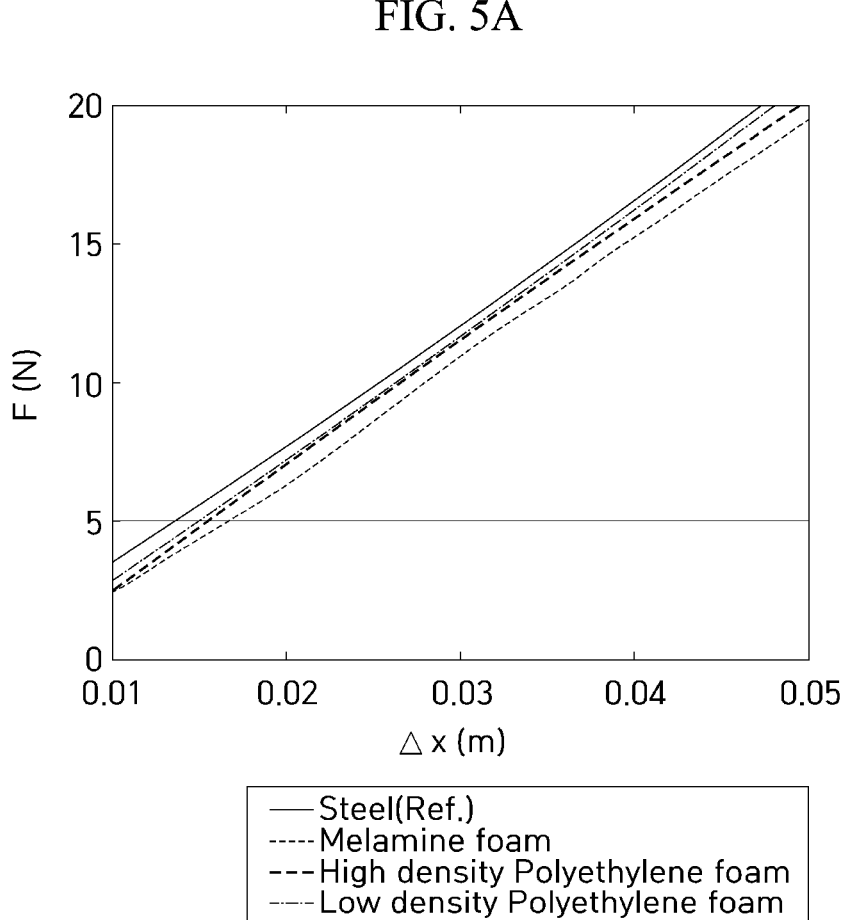
Figure 5B:
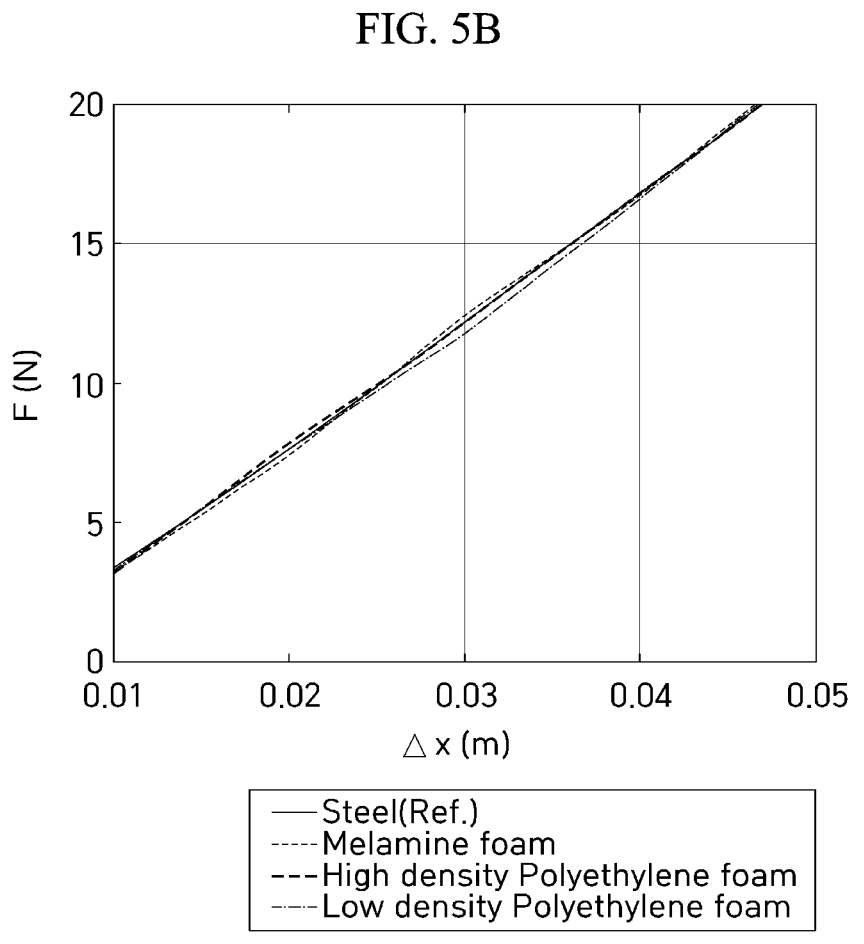

The effects of the present disclosure can be seen as shown in FIG. 5A (a case in which the mutual contact force-based compensator 20 is not used) and FIG. 5B (a case in which the mutual contact force-based compensator 20 is used), the force of the robot 40 is controlled to act uniformly on the contact surfaces of objects from very hard iron to a soft sponge, that is, contact surfaces of steel, melamine foam, high density polyethylene foam, and low density polyethylene foam. In FIG. 5A, a displacement deviation $\Delta x$ on the horizontal axis represents a relationship $\Delta x = x_a$ of the existing admittance control method, and in FIG. 5B, a displacement deviation $\Delta x$ on the horizontal axis represents a relationship $\Delta x = x_a + \alpha$ to which a compensation value is applied. Referring to FIG. 5B, it can be seen that force control is performed in an almost constant manner on contact target objects through the method according to the present disclosure.

Figure 6:
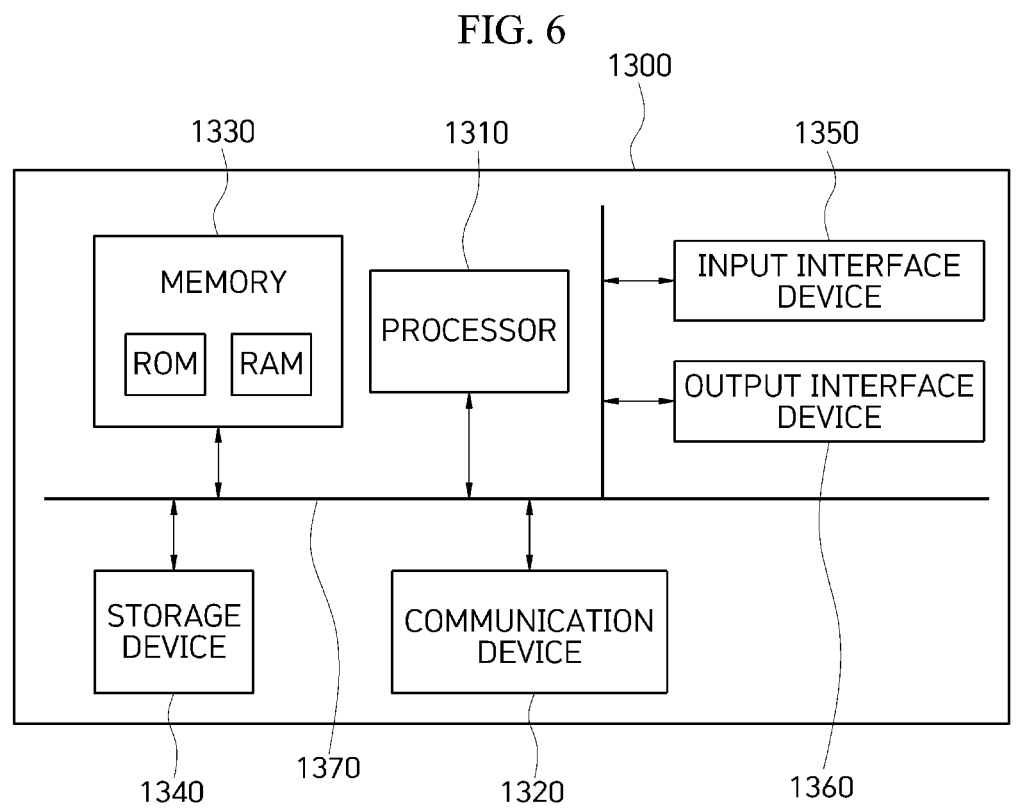
FIG. 6 is a block diagram illustrating a computer system that may be utilized to implement the present disclosure.

FIG. 6 is a block diagram illustrating a computer system for implementing the embodiment of the present disclosure described above.

Referring to FIG. 6, a computer system 1300 may include at least one of a processor 1310, a memory 1330, an input interface device 1350, an output interface device 1360, and a storage device 1340 that communicate with each other via a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or nonvolatile storage media. For example, the memory 1330 may include a read only memory (ROM) and a random access memory (RAM). In the embodiment of the present disclosure, the memory 1330 may be located inside or outside the processor 1310, and the memory 1330 may be connected to the processor 1310 through various known devices. The memory 1330 is a volatile or non-volatile storage medium of various types. For example, the memory 1330 may include a ROM or a RAM.

Accordingly, the present disclosure may be implemented as a computer-implemented method or as a non-transitory computer-readable medium in which computer-executable instructions are stored. In one embodiment, when executed by a processor, computer readable instructions may perform a method according to at least one aspect of the present disclosure.

In addition, the method according to the present disclosure can be implemented in the form of program instructions executable by a variety of computer components and may be recorded on a computer readable medium. The computer readable medium may include, alone or in combination, program instructions, data files and data structures. The program instructions recorded on the computer readable medium may be components specially designed for the embodiment of the present disclosure or may be known and usable by a skilled person in the field of computer software. The computer readable medium may include a hardware device configured to store and execute program instructions.

For example, the computer readable record media include magnetic media such as a hard disk, a floppy disk, or a magnetic tape, optical media such as a compact disc read only memory (CD-ROM) or a digital video disc (DVD), magneto-optical media such as floptical disks, a ROM, a RAM, a flash memory, and the like. The program instructions include not only machine language code made by a compiler but also high level code that is executable by a computer through an interpreter and the like.

Robot force control is becoming more useful and necessary according to the spread of cooperative robots. Through the present disclosure, even non-experts can easily use the robot force control, and universal robot force control is possible without prior knowledge of a contact surface or a contact object.

In addition, the precision of force control can be improved compared to the existing method, and the performance of force control can be maintained through automatic tuning. As the use of collaborative robots is diversified, robot task teaching is required in a large number of places, and since engineers cannot responsively tune a force controller in every process, the present disclosure provides a benefit of using rapid and easy admittance control through an automatic tuning system. The force teaching task through the robot according to the present disclosure can improve convenience, by which the efficiency of the robot teaching is enhanced, thereby shortening the time for applying the robot to the task site.

In particular, when work using an industrial robot necessarily requires admittance control, imprecise force control can be supplemented through a mutual contact force-based compensator according to the present disclosure, and thus it is expected that high-precision work that was previously impossible can be performed The present technology is expected to be applicable to multi-joint robots, manipulators, and other single-axis actuators or haptic devices that require force control. In particular, the present disclosure can be more effective when used in a robot for a process requiring a high-level force work. In addition, the present disclosure can be applicable to a remote force teaching system, and can be universally used not only for robots but also for various systems that deal with force While embodiments of the present disclosure have been described in detail, it should be understood that the technical scope of the present disclosure is not limited to the embodiments and drawings described above, and is determined by a rational interpretation of the scope of the claims.

What is claimed is:

1. A system for precise force control of a robot, the system comprising:
   the robot, said robot including:
      a force acting part that is a distal end part or end-effector of the robot, and that contacts a contact surface of a contact object;
      at least one processor; and
      memory storing instructions that when executed by the at least one processor, result in:
   an admittance controller that detects a contact force, which is applied to the contact surface of the contact object by the force acting part of the robot, to obtain a displacement; and
   a mutual contact force-based compensator that estimates a mutual contact stiffness of the contact object, derives a compensation value from the mutual contact stiffness, and compensates for the displacement derived from the admittance controller with the derived compensation value, wherein the force acting part is controlled to perform a task according to a control signal derived from the displacement as compensated by the mutual contact force-based compensator.

2. The system of claim 1, wherein, in order to estimate the mutual contact stiffness, the mutual contact force-based compensator:
   initially detects a contact force with respect to a displacement deviation during a time in which the force acting part of the robot is in contact with an object to estimate the mutual contact stiffness; and
   derives the compensation value from the mutual contact stiffness.

3. The system of claim 1, wherein a material of the contact surface of the contact object is identified from the estimated mutual contact stiffness.

4. The system of claim 1, wherein the instructions, when executed by the at least one processor, further result in an automatic tuner that automatically tunes the compensation value of the mutual contact force-based compensator.

5. The system of claim 1, wherein the mutual contact stiffness and the compensation value of the mutual contact force-based compensator are determined by a linear relationship.

6. The system of claim 5, wherein the instructions, when executed by the at least one processor, further result in an automatic tuner that estimates a coefficient that determines a form of the linear relationship.

7. The system of claim 6, wherein the estimation of the coefficient is performed by one of a data-based optimization process and a least square method.

8. A precise force control method of a robot, the method comprising:
   providing the robot, said robot including:
      a force acting part that is a distal end part or end-effector of the robot and that contacts a contact surface of a contact object;
      at least one processor; and
      memory storing instructions that, when executed by the at least one processor, result in:
   an admittance control operation of detecting a contact force, which is applied to the contact surface of the contact object by the force acting part of the robot, to obtain a displacement;
   a mutual contact force-based compensating operation of estimating a mutual contact stiffness of the contact object, deriving a compensation value from the mutual contact stiffness, and compensating for the displacement derived in the admittance control operation with the derived compensation value; and
   controlling the force acting part to perform a task according to a control signal derived from the displacement as compensated by the mutual contact force-based compensator.

9. The method of claim 8, wherein the mutual contact force-based compensating operation includes:
   in order to estimate the mutual contact stiffness, initially detecting a contact force with respect to a displacement deviation during a period of time in which the force acting part of the robot is in contact with an object to estimate the mutual contact stiffness; and
   deriving the compensation value from the mutual contact stiffness.

10. The method of claim 8, further comprising identifying a material of the contact surface of the contact object from the estimated mutual contact stiffness.

11. The method of claim 8, further comprising automatically tuning the compensation value derived in the mutual contact force-based compensating operation.

12. The method of claim 8, wherein the mutual contact stiffness and the compensation value are determined by a linear relationship.

13. The method of claim 12, further comprising estimating a coefficient that determines a form of the linear relationship.

14. The method of claim 13, wherein the estimating of the coefficient includes:

acquiring force data obtained in the mutual contact force-based compensating operation; and finding a relationship between the mutual contact stiffness and the compensation value from the acquired data, and estimating a coefficient of the relationship.

15. The method of claim 14, wherein the estimating of a coefficient is performed by one of a data-based optimization process and a least square method.

* * * * *